Feb. 24, 1925.
H. TATJE
SAW FOR LINTER MACHINES
Filed May 5, 1924
1,527,759
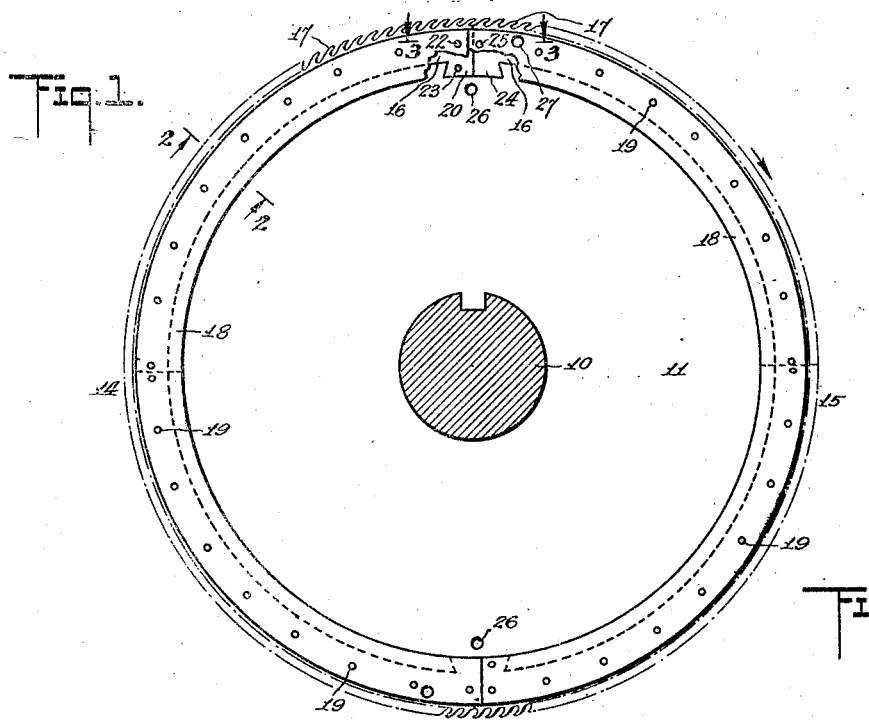
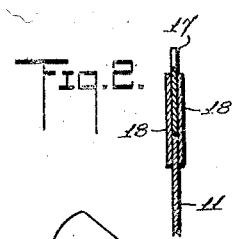
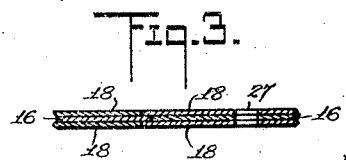
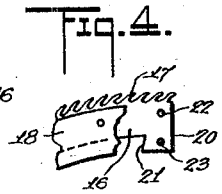
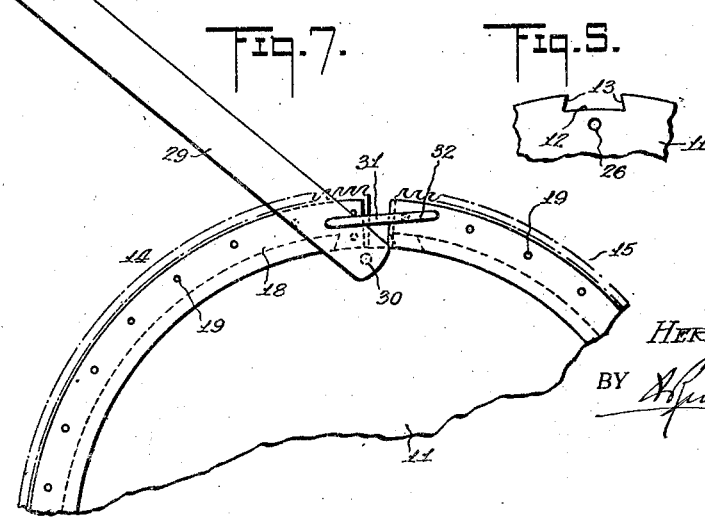
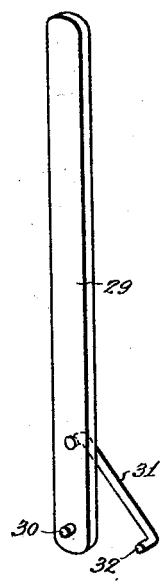
INVENTOR
*Herman Tatje*
BY
ATTORNEY Patented Feb. 24, 1925.

1,527,759

UNITED STATES PATENT OFFICE.

HERMAN TATJE, OF BROOKLYN, NEW YORK.

SAW FOR LINTER MACHINES.

Application filed May 5, 1924. Serial No. 711,133.

*To all whom it may concern:*

Be it known that I, HERMAN TATJE, a citizen of the United States, and a resident of Brooklyn, in the county of Kings and State of New York, have invented a new and useful Improvement in Saws for Linter Machines, of which the following is a full, clear, and exact description.

This invention pertains to saws for linter machines and it is my object to provide a construction of saws which is an improvement over the construction shown in my Patent No. 1470779, issued October 16, 1923.

Linter machines, as commonly constructed, are provided with a large number of disk saws mounted very closely together upon a shaft or arbor. Owing to the fact that the saw disks must necessarily be thin, it is difficult to harden them without warping of the disks and such warping would be very disadvantageous because of the close proximity of one saw to another. Consequently the saws are not hardened and wear out rapidly in service.

The object of the present invention and also of that disclosed in my previous patent, above cited, is to provide carrier disks of comparatively soft material with saw blades secured thereto which blades are subjected to the proper heat treatment to render them tough and resistant to wear. This makes it unnecessary to stop the linter machine frequently to replace worn out blades. Furthermore, if a blade breaks, it may be replaced without necessitating replacement of the disk which carries the blade.

While this result was obtained in my previously patented invention, the construction possessed the drawback that it was impossible to replace a saw blade without removing the carrier disk from the arbor and if a break occurred in the center of the group of saws, all the saw disks up to and including broken saw, had to be removed from the arbor before a new blade element could be affixed to replace the broken one.

It is an object of the present invention to provide a construction whereby blade elements can be replaced without removing the carrier disks from the arbor.

Another object is to provide a cheaper and more convenient means of attaching the blade elements to the carrier disk.

With these and other objects in view, my invention consists in certain novel features of construction, combination and arrangement of parts which will be more fully described and pointed out in the claims.

In the accompanying drawings:

Figure 1 is a face view of my improved saw, mounted on the arbor of a linter machine and partly broken away to show certain details;

Fig. 2 shows a fragment of the saw representing a section taken on line 2—2 of Fig. 1;

Fig. 3 shows a cross section taken on line 3—3 of Fig. 1;

Fig. 4 is a view of a fragment of a saw blade element partly broken away to show certain details;

Fig. 5 is a fragment of the disk which carries the saw blade sections;

Fig. 6 is a view of a tool used in applying the saw blade elements to the disk, and Fig. 7 illustrates the method of using the tool in applying the saw blade elements to the disk.

In Fig. 1, I have shown an arbor of a linter machine at 10. Mounted on this arbor and keyed thereto is a disk 11. At diametrically opposite sides of the disks, a notch 12 is formed therein. This notch, as indicated in Fig. 5, is of dovetail form, the side walls 13 of the notch being inclined and undercut.

Mounted on the disk 11, are two semi-circular saw blade elements 14 and 15, which are of identical construction. Each element comprises one or more saw blades 16, formed with teeth 17 and clamped between a pair of semi-circular side plates 18 riveted or spot welded thereto, as indicated at 19. Plates 18 overlap the blades 16 along the inner periphery thereof so that between the plates on each side of the blade a recess is formed which is adapted to receive the edge of disk 11. It will be understood of course, that the toothed outer periphery of the blades 16 projects beyond the side plates 18.

The teeth 17 of the saw blades are inclined in the direction of rotation of the saw, this direction being indicated by an arrow in Fig. 1. At the forward end of the saw blade element or that end toward which the saw teeth are inclined, the saw blade is provided with a toe piece 20 which projects inwardly and is formed with an undercut or inclined rear wall 21 adapted to fit against one of the inclined walls 13 of one of the notches 12. As this end of the saw takes the principal thrust when the saw is in service, the blade is securely riveted to the side plates 18 by means of rivets 22 and 23. At the opposite end of each saw blade element, is a heel 24 which is an extension similar to the toe piece 20, having an inclined wall at one side adapted to match one of the inclined walls of the notch 12. At the heel, the saw blade is secured to the side plates by means of a single rivet 25 which is located near the outer periphery of the plates.

By referring to Figs. 1 and 3 it will be observed that the saw blade at the toe end projects slightly beyond the side plates 18, while at the heel end the side plates project slightly beyond the blade, so that when the blade sections are assembled on the disk there is a tongue and groove joint formed between the two elements.

In applying the blade elements to a disk the toe pieces are first inserted in the slots 12 with the wall 21 of each toe piece bearing against one of the inclined walls 13. The elements are then fitted upon the disk with the side plates 18 overlapping opposite faces of the disks. Because at the heel end a single rivet 25 is used to attach the side plates to the blade, one of the plates may be sprung slightly away from the heel sufficiently to admit the edge of the disk. The element is then drawn snugly against the disk until the heel 24 is brought into alinement with the notch 12 when it will snap into said notch, hooking against one of the shoulders 13, thereby locking the element securely upon the disk.

To assist in drawing the element into this locked position, I provide a hole 26 in the disk 11 under each notch 12 and a hole 27, in each saw blade element near the heel. I then employ a tool consisting of a bar 29 formed at one end with a pin 30 and having a link 31 pivoted to the bar near the pin. The link 31 terminates in a projection 32. The pin 30 is inserted in the hole 26 and the projection 32 in the hole 27, then upon operating the bar 29 as a lever with the pin 30 as fulcrum the saw blade element may be drawn into position with the heel engaging slot 12 and the side plates 18 at the heel of one saw blade element, overlapping the toe of adjacent blade. When thus applied, the saw blade elements are firmly secured to the carrier disk 11.

The thrust on each saw blade element is taken by the toe piece 20 and owing to the two rivets 22 and 23 which secure it rigidly to the side plates 18, it cannot be removed from the disk by lateral displacement. At the heel end where the thrust is comparatively negligible lateral displacement will be prevented by the side plates 18 which spring back into place snugly against the heel 24 as soon as it has snapped into the notch 12. When a saw blade is broken or worn out and it is necessary to replace a saw blade element with a new one, it may be removed from the disk 11 by bending up one of the side plates at the heel of the blade element and moving the heel out of engagement with the side wall 13 of the notch 12.

For purposes of economy in manufacture, it may be desirable to form each saw blade element of a number of separate saw blades, which can very readily be done, owing to the fact that the blades are rigidly secured by spot welding or by means of rivets to the side plates 18. As indicated by dotted lines in Fig. 1, I have shown each saw blade element made up of two blades but if desirable the elements may be made of a single blade or of more than two blades.

It will be evident also, that instead of using two semi-circular blade elements 14 and 15 a single blade element might be employed, which would be of annular form but open ended with a toe piece at one end and a heel piece at the other end, in such case the disk 11 will be formed with a single notch.

I claim:

1. A saw for linter machines comprising a carrier plate formed with notches, a saw blade element formed with a recess to receive the edge of the plate, and means on the blade element at opposite ends of the recess for interlocking with said notches.

2. A saw for linter machines comprising a carrier plate formed with hooks in its edge, and a saw blade element formed with hooks adapted to interlock with the aforesaid hooks, said blade element being further formed with extensions at each side adapted to overlap an edge of the carrier plate on opposite sides thereof.

3. A saw for linter machines comprising a carrier plate formed with hooks in its edge, a saw blade element formed with a mortise at one end, a tenon at the other end of the element, hooks on said element adapted to engage the aforesaid hooks, side plates on said element adapted to overlap an edge of the plate on opposite sides thereof.

4. A saw for linter machines comprising a carrier plate formed with notches having undercut side walls and a blade element formed with a recess into which an edge of the plate may be fitted, said recess terminating in inwardly inclined walls adapted to interlock with the walls of said notches.

5. A saw for linter machines comprising a disk formed with undercut notches, and a plurality of arcuate blade sections, each formed with a recess adapted to receive the edge of the disk, the recess terminating at each end in inwardly inclined walls adapted to interlock with the notches.

6. A saw for linter machines comprising a disk formed with undercut notches, an arcuate saw blade, arcuate plates secured on opposite sides of the blade and overlapping the inner periphery thereof to form a recess adapted to receive the edge of the disk and inwardly extending undercut projections on the blade at each end adapted to engage said undercut notches.

7. A saw for linter machines comprising a disk formed with an undercut notch, a plurality of arcuate blade sections, a plurality of arcuate side plates overlapping the inner periphery of the blade sections and adapted to overlap the edge of the disk and inwardly extending undercut projections at each end of the blade element adapted to interlock with said notches.

8. A saw for linter machines comprising a disk formed with undercut notches and a blade element comprising an arcuate saw blade, arcuate plates secured on opposite sides of the blade and overlapping the inner periphery of the blades to form a recess for the reception of the disk, a toe piece at the forward end of the blade securely riveted to the side plates and a heel at the rear end of the blade with its lower end unattached to the side plates, said toe piece and heel respectively being adapted to interlock with the notches in the disk.

9. A saw for linter machines comprising a disk formed with undercut notches and a blade element comprising an arcuate saw blade, arcuate plates secured on opposite sides of the blade and overlapping the inner periphery of the blade to form a recess for the reception of the disk, a toe piece at the forward end of the blade securely riveted to the side plates and a heel at the rear end of the blade with its lower end unattached to the side plates, said toe piece and heel respectively being adapted to interlock with the notches in the disk, the blade at the toe end projecting beyond the side plates to form a tenon and the side plates at the heel projecting to form a groove for the reception of the tenon.

10. A saw for linter machines comprising a disk formed with undercut notches and a blade element comprising an arcuate saw blade, arcuate plates secured on opposite sides of the blade and overlapping the inner periphery of the blades to form a recess for the reception of the disk, a toe piece at the forward end of the blade securely riveted to the side plates and a heel at the rear end of the blade with its lower end unattached to the side plates, said toe piece and heel respectively being adapted to interlock with the notches in the disk, the blade at the toe end projecting beyond the side plates to form a tenon and the side plates at the heel projecting to form a groove for the reception of the tenon, the blade element and the carrier plate being each formed to receive a tool for drawing the blade element into position upon the disk.

11. A blade element for a linter saw comprising an open ended annular saw blade, side plates secured on opposite sides of the blade and overlapping the inner periphery of the blade to form a recess, and inwardly extending undercut projections on the blade at each end forming end walls for the recess.

12. A blade element for a linter saw comprising two open ended annular side plates, a plurality of arcuate saw blades clamped between the side plates with the toothed edge of the blades projecting beyond the side plates and the latter overlapping the inner periphery of the blades to form a recess, and inwardly extending undercut projections on the blades at each end of the blade element forming end walls for the recess.

13. A blade element for a linter saw comprising two open ended annular side plates, a plurality of arcuate saw blades clamped between the side plates with the toothed edge of the blades projecting beyond the side plates and the latter overlapping the inner periphery of the blades to form a recess, and inwardly extending undercut projections on the blades at each end of the blade element forming end walls for the recess, the extension at the forward end of the blade element being firmly secured to the side plates.

14. A blade element for a linter saw comprising two open ended annular side plates, a plurality of arcuate saw blades clamped between the side plates with toothed edge of the blades projecting beyond the side plates and the latter overlapping the inner periphery of the blades to form a recess, inwardly extending undercut projections on the blades at each end of the blade element forming end walls for the recess with the projection at the forward end of the blade element firmly secured to the side plates while the projection at the rear end is unattached to the side plates to permit of springing the side plates away from the projection, a tenon at one end of the blade element, and a mortise at the other end of the blade element.

15. A blade element for a linter saw comprising two open ended annular side plates, a plurality of arcuate saw blades clamped between the side plates with toothed edge of the blades projecting beyond the side plates and the latter overlapping the inner periphery of the blades to form a recess, inwardly extending undercut projections on the blades at each end of the blade element forming end walls for the recess with the projection at the forward end of the blade element firmly secured to the side plates while the projection at the rear end is unattached to the side plates to permit of springing the side plates away from the projection, the blade element being also formed with means for attaching a tool thereto.

HERMAN TATJE.